United States Patent [19]

Despic et al.

[11] Patent Number: 4,800,009
[45] Date of Patent: Jan. 24, 1989

[54] ELECTROCHEMICAL CELL WITH MOVING ELECTRODE

[76] Inventors: Aleksandar Despic, Vlajkoviceva 13; Kosta Krsmanovic, Dr. Nika Miljanica 7, both of 11000 Beograd, Yugoslavia

[21] Appl. No.: 86,313

[22] Filed: Aug. 17, 1987

[30] Foreign Application Priority Data

Apr. 24, 1987 [YU] Yugoslavia .................. 749/87

[51] Int. Cl.$^4$ .................. C25D 17/10; C25B 9/00; C25C 7/02; H01M 4/00
[52] U.S. Cl. .................. 204/225; 204/269; 204/279; 204/286; 429/27
[58] Field of Search ........... 204/225, 286, 279, 242, 204/269; 429/27, 113

[56] References Cited

U.S. PATENT DOCUMENTS

| | | | |
|---|---|---|---|
| 2,959,527 | 11/1960 | De Varda | 204/225 X |
| 3,554,893 | 1/1971 | De Varda | 204/286 X |
| 3,620,954 | 11/1971 | Ziegler et al. | 204/225 X |
| 4,288,309 | 9/1981 | Cohen | 204/225 |
| 4,319,970 | 3/1982 | Schatton et al. | 204/286 X |
| 4,405,433 | 9/1983 | Payne | 204/225 |
| 4,551,399 | 11/1985 | Despic | 429/27 |
| 4,707,239 | 11/1987 | Murphy et al. | 204/286 X |

OTHER PUBLICATIONS

"Aluminium-Air Battery for Electric Vehicles", by Aleksandar Despic and Predrag Milanovic, vol. 12, (1979), No. 1, pp. 1-18.

Primary Examiner—Donald R. Valentine
Attorney, Agent, or Firm—Harness, Dickey & Pierce

[57] ABSTRACT

The invention concerns an electrochemical cell with moving electrode which can be used for chemical current sources or electrolyzers in which one electrode is being consumed. A constant spacing between the electrode 1 and 6 is provided for. This is achieved by applying a force, for instance gravity, on one side of one electrode, which is transferred by means of a slanting plane or links at the sides of the electrodes to a direction perpendicular to the electrode surface, causing the motion of one electrode towards the other when one of them is consuming (dissolving).

20 Claims, 4 Drawing Sheets

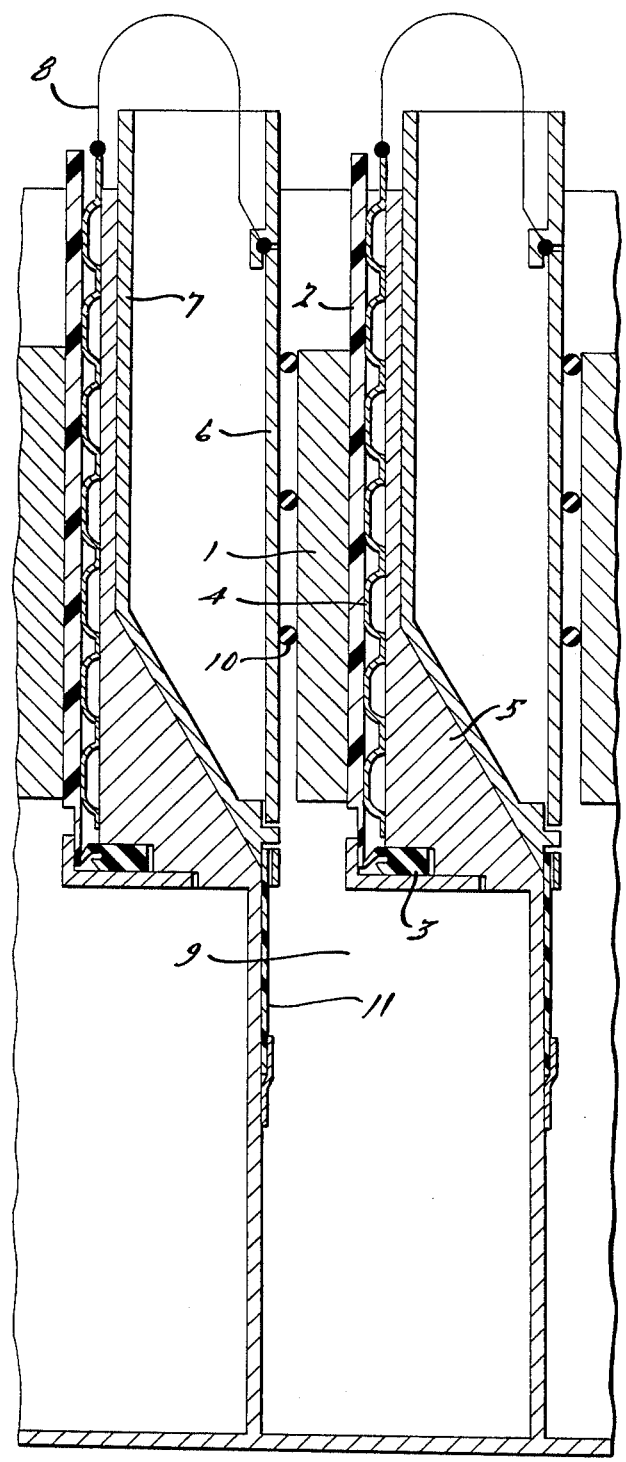

ELECTROCHEMICAL CELL WITH MOVING ELECTRODE

TECHNICAL FIELD TO WHICH THE INVENTION BELONGS

The invention belongs to the domain of electrochemistry, and more particularly to the domain of the structure of electrochemical cells for use in chemical current sources and electrolyzers.

1. Technical Problem

The technical problem is how to solve an automatic maintenance of a constant interelectrode spacing in an electrochemical cell when one electrode is being consumed (dissolved) in the electrochemical process.

2. Prior Art

There is a large number of electrochemical processes in practical application wherein one electrode is consumed (dissolved) in the course of the process (for instance metal-air batteries, some electrochemical syntheses, and the like). Several problems appear in such processes: as one electrode is being consumed the interelectrode spacing is increasing and so is the electrolyte resistance between the electrodes, thus increasing the loss of energy; some active material is lost because of the need to take the electrodes out of the cell for replacement before they are entirely consumed; electrode replacements present difficulties, especially when current leads have to be disconnected and connected again to the new electrodes; the contacts between neighbouring cells in the battery are frequently weak points where failure can occur. In the past, attempts have been made to overcome the first problem in many ways, for instance by pushing the electrode against each other by springs or rubber cushions with air under pressure, etc. A recent development is the wedge cell principle and the bipolar semi-wedge cells, in which the anode in the form of a wedge sinks as it dissolves and automatically maintains a constant interelectrode distance. This principle also provides for a complete utilization of the active material and for an easy insertion of new electrodes through the cell cover by leaning them on the old electrodes being consumed. The contact between adjacent cells is established by pressing the anode of one cell against the enlarged cathode wall of the other cell, and thus the bipolar arrangement of cells in the battery is achieved.

However, the operation of such cells is faced with problems. Small differences in the flow of the electrolyte along the wedge edges produce uneven dissolution and this brings about a deformation of the wedge which hinders its dissolution. Because of this a stronger force must be applied on the top edge of the anode, which in the working conditions of the cell can produce a deformation of the cathode. Finally, the contact between the anode and the conducting wall is weak and causes a significant resistance and loss of energy. See: A. R. Despić, P. D. Milanović: Aluminium-Air Battery for Electric Vehicles, Rec. Trav. Inst. Sci. Techn. Acad. Serbe Sci. et Art, 12, 1-18 (1979) A. Despić: Bipolar battery metal-air with semi-wedge self-breeding anode. Yug.Pat.Appl.No. P-1224/83 (2.6.1983), U.S. Pat. No. 4,551,399 (Nov. 5, 1985).

DESCRIPTION OF THE SOLUTION OF THE TECHNICAL PROBLEM

The present invention largely eliminates the mentioned problems. The object of the invention is a cell for electrochemical processes in which an electrode is consumed, and the structure of which permits that one electrode moves to the other when a force is applied on one edge. As the force, gravity can be used, i.e. the weight of the electrode, but some other force can be used as well.

BRIEF DESCRIPTION OF THE DRAWINGS

The invention will be described in more detail in the text that follows and by reference to the drawings, the figures of which represent:

FIGS. 1a and 1c represent the initial position of the electrodes, and 1b and 1d represent the position of the electrodes at which they operate after one electrode is consumed.

FIG. 2 is a partial cross-sectional view of one type of cell with a sliding electrode as applied to a metal-air battery.

Figure 1A:
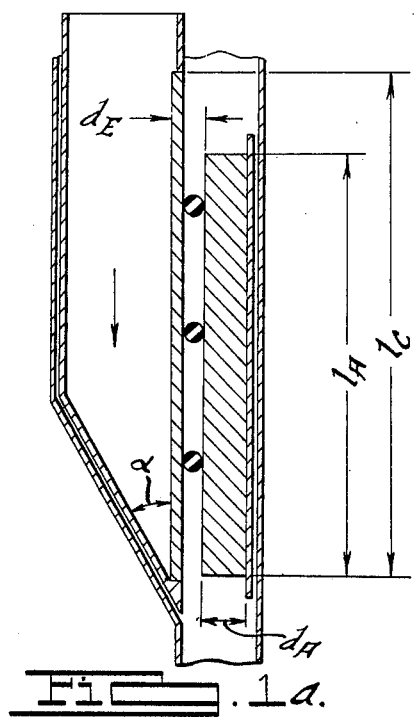
FIGS. 1a, b, c and d the principle of operation of the cell, whereby

The conversion of the force at the edge into a motion perpendicular to the edges can be achieved in at least two ways diagrammatically represented in FIGS. 1a, b c, and d.

In a first case (FIG. 1a), one electrode has a sloping back side which bears on an equally sloping plane and can slide along it.

Figure 1B:
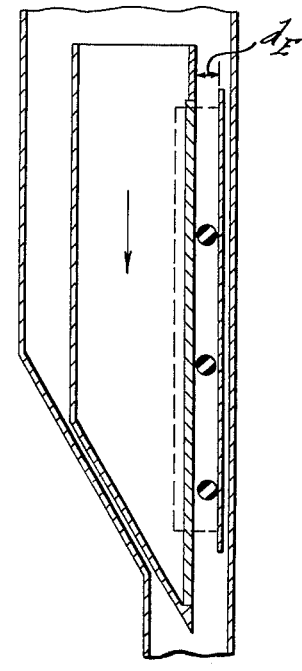
Figure 1C:
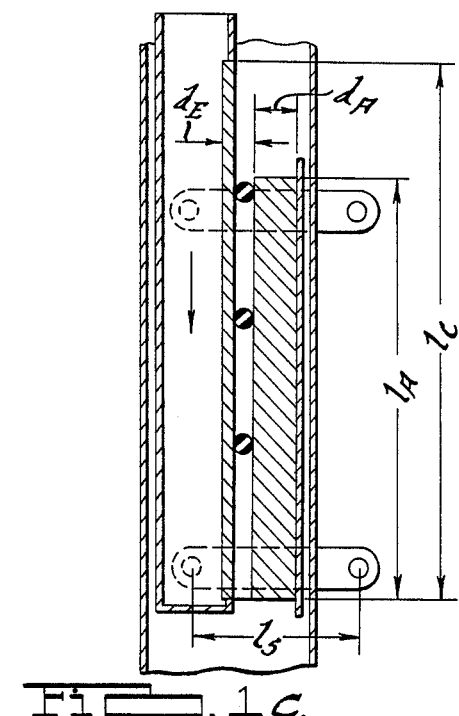
Figure 1D:
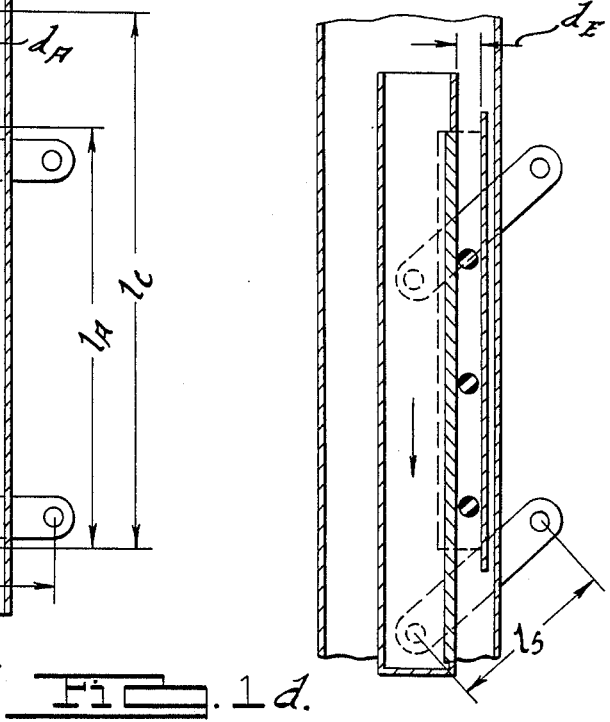

If, for instance, an anode of thickness $d_A$ is consumed, and the cathode slides along the sloping plane, from the beginning of the operation (FIG. 1, 1a) to the complete consumption of the anode (FIG. 1, 1b), the cathode has to move a distance $d_A$. For the anode to have in front of it the cathode on its whole length, the cathode must be longer than the anode. If the angle which the sloping side of the cathode forms with its surface is $\alpha$, the cathode length has to be $$l_c = l_A + d_A \cot g\alpha$$

wherein $l_A$ is the anode length and $d_A$ the thickness thereof.

In a second case (FIG. 1c) the electrodes are fastened to each other by at least two pairs of links in the form of solid plates, by means of pins driven into the sides of the electrodes. If, for instance, the anode 1 is consumed and the cathode 6 moves, guided by the links 15, between the pins 16 from the beginning of the cell's operation (FIG. 1c) to the complete consumption of the anode (FIG. 1d) the cathode 6 has to move towards the anode 1 for a distance equal to the initial thickness $d_A$ of the latter. For the anode 1 to have all the time in front of it and on its whole length the cathode 6, the latter has to be longer than the anode 1. If the length of the link $l_s = d_E + d_A + 2\Delta$, wherein $\Delta$ is the distance between the surface of the cathode 6 (respectively of the support 5 of anode 1) and the pin 16 of the links 15, the length of the cathode 6 has to be $$l_c = l_A d_A^2 + 2(2\Delta + d_E)d_A$$

wherein $d_E$ is the thickness of the electrolyte layer between the electrodes 1,6.

It is to be understood that in both the first and second cases described above, other combinations are also possible, i.e. that the cathode 6 is consumed and that the anode 1 slides (moves guided by the links) downwards, upwards, or sideways, and the like.

On such solutions are based the cells for chemical current sources of the type metal-air and electrolyzers for electrochemical syntheses in which one electrode is consumed.

One type of cell structure for metal-air batteries is shown in FIG. 2. An electrochemically active metal, consumed during cell operation, represents the anode 1 in the form of a metallic plate stuck with electroconductive material to a thin metal sheet 2, the edges of which are inserted in a groove with a seal 3 of elastic material which seals the rim of the sheet 2. Behind the seal 3 is disposed a profiled metal strip 4 on which bears the sheet 3, providing electric contact. Said seal 3 and metal strip 4 are fixed on an anode support 5 which has a bevelled external side. The air cathode is fixed on a support 7 which also has a rear side bevelled on one part or wholly, at the same angle as the external side of the support 5 of anode 1. The cathode support 7 bears and slides on the bevelled side of the support 5 of anode 1 of the adjacent cell on one hand, and the support 5 of anode 1 of this cell provides with its bevelled side support for the cathode 6 of the adjacent cell of the other hand. The cathode 6 is connected with an electric lead 8 with the strip 4 of the adjacent cell on one hand, and the strip 4 of the cell is connected with the cathode 6 of the adjacent cell on the other hand by a similar lead 8. The electrolyte is located in the space between the electrodes 1 and 6 and in the tank 9 below the electrodes 1 and 6. The spacing between the cathode 6 and the anode 1 is maintained constant by means of spacers 10 which are fixed on the cathode 6 and move downwards along with it as the anode is consumed. Owing to the sloping planes as supports, the cathode 6 moves also towards the anode 1, thus maintaining the spacing determined by the spacers 10. In view of the fact that during the motion of cathode 6 towards the anode 1 down the sloping plane, an empty space is formed behind the vertical part of the wall of cathode 6 (if provided), in order to prevent the electrolyte entering into said space, between the edge of the cathode 6 wedge and the wall of the tank 9 is stuck a plastic foil 11. The support 7 of cathode 6 is open on one side to provide access for air.

Figure 3:
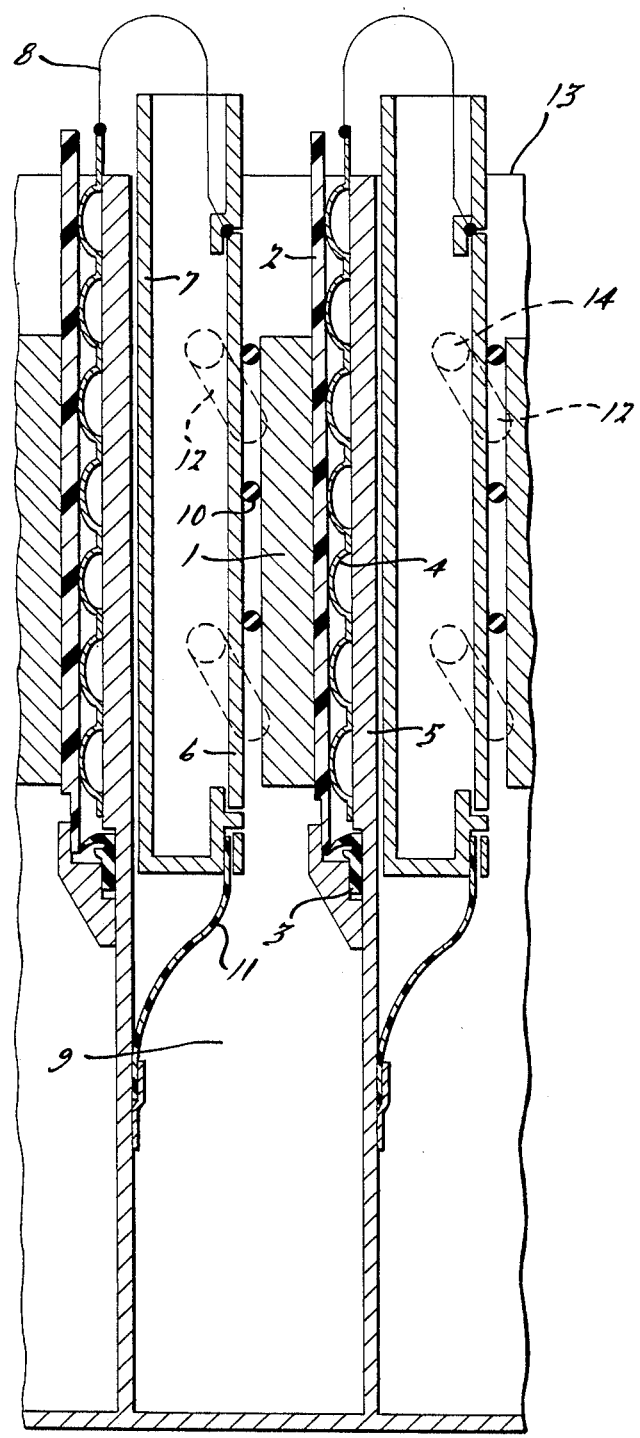
FIG. 3 is a partial cross-sectional view of another type of cell with an electrode sliding down grooves as applied to a metal-air battery.

The other type of cell structure for metal-air batteries is shown in FIG. 3. It is entirely similar to the type shown in FIG. 2, with the exception the sliding on the sloping plane is provided in slanting grooves 12, cut in the outside walls of cell 13 on the side of cathode 6, and through pairs of cylindrical pins 14 built in on the sides of the support 7 of cathode 6. In this type of cell the support 5 of anode 1 is flat, and the bottom of the support 7 of cathode 6 is also flat.

Figure 4:
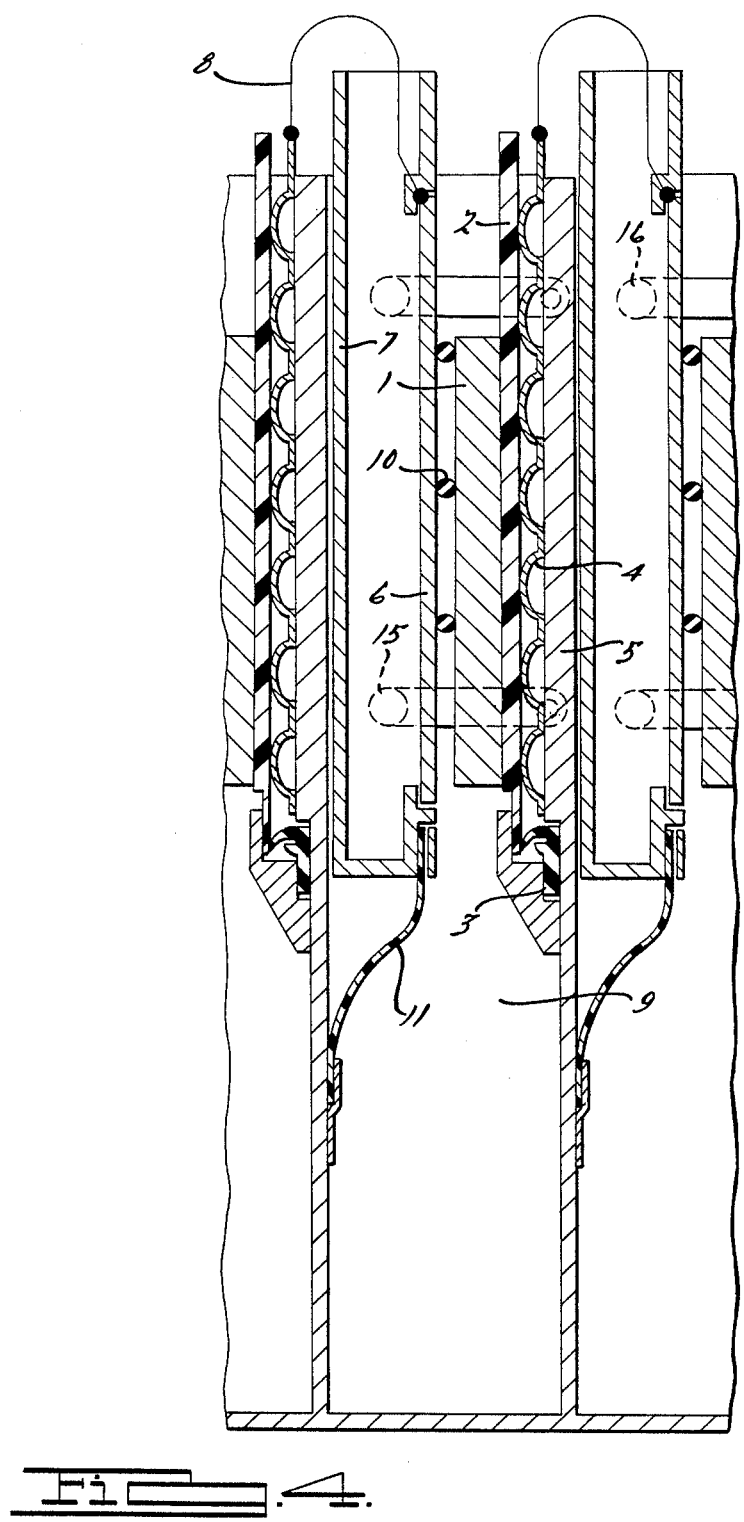
FIG. 4 is a partial cross-sectional view of a third type of cell with electrodes joined with links.

The third type of cell structure for metal-air batteries is shown in FIG. 4. It is entirely similar to the previous type shown in FIG. 3, except that the sloping planes are replaced by links 15 which connect the supports 7 of cathode 6 and anode 1 (preferably by means of cylindrical pins 16 built in the sides of supports 5 and 7).

The same such structure can be used as electrolyzers, with the proviso that for such a purpose appropriate cathodes and anodes as required by a process of electrochemical synthesis are built in.

EXAMPLES

EXAMPLE 1

A chemical current source aluminium air with salt electrolytes was constructed according to the structure type shown in FIG. 2, for building into a battery. The anode 1 was made from an electrochemically active aluminium alloy in the form of a $20 \times 10 \times 0.8$ cm plate soldered on a $23 \times 11 \times 0.03$ cm steel sheet 2. With such dimensions, on three sides of the anode remains a sheet metal frame of 0.5 cm and on the fourth one of 2.5 cm. Said three sides are inserted in a seal 3 of silicon rubber. A steel strip 4 is also placed therein and is so folded that it firmly braces the sheet 2 of anode 1, to provide a good electrical contact. The cathode 6 is a commercial air electrode of Bulgarian production. In view of the fact that the support 7 of cathode 6 has a bottom side bevelled at an angle of 30° to the surface of cathode 6, on the ground of equation 1 given before, a length of 21.4 cm has been determined for cathode 6. The active width of cathode 6 is the same as that of anode 1, i.e. 10 cm. The spacers 10 are strings of plastic material having a 0.2 cm diameter, glued at the ends to the edges of the support 7 of cathode 6. They are slack, such that they can move up and down when the electrolyte periodically moves.

Four such cells are connected into batteries. A neutral 2 M NaCl solution is used as electrolyte. Each cell takes 1 dm$^3$ of electrolyte. A special device provides for the motion of the electrolyte up and down between the electrodes 1 and 6, at a frequency of 1 Hz and amplitude of 0.5 cm, which was sufficient for the reaction product to separate in the form of a sandy sediment.

Such a battery was yielding a voltage of 5 V at a current of 2A, and functioned with no problem for 600 h, until practically all the active material was consumed.

EXAMPLE 2

An electrolyzer for the electrochemical synthesis of tetraethyl was constructed according to the structure type shown in FIG. 4. As the anode 1 being dissolved in the course of the process, a $20 \times 20 \times 1$ cm lead plate was used, soldered on a $25 \times 21 \times 0.05$ cm steel sheet 2. The sheet 2 was inserted into a seal 3 with a contact srip 4, same as in Example 1. All this was glued onto the support 5 of anode 1, made of plastic material in the form of a $25 \times 21 \times 0.5$ cm plate which serves as one of the outside walls of the electrolyzer. The cathode 6 was made of steel sheet and is glued on the support 7 formed by a plastic material plate. The length of cathode 6 was determined by using the equation mentioned earlier. With a spacing $\Delta$ of 0.5 cm and a thickness of the electrolyte layer of 0.5 cm, it amounts to 22 cm. The length of cathode 6 was 20 cm and its thickness 0.2 cm. The pins 16 were made of Teflon in the form of cylinders having a length of 20 cm and a diameter of 0.3 cm and were built in the sides of the cathode and anode supports 5 and 7. They were joined by means of links of steel sheet coated with Teflon.

Such a structure permitted a good functioning of the electrolyzer. The lead plate was consuming evenly and the cathode was lowering such that a constant spacing of 0.5 cm provided by the spacers was maintained between the cathode 6 and the anode 1.

We claim:

1. A plurality of electrochemical cells each having an anode, a support said anode, a cathode, and a support for said cathode, one of said anode and said cathode being movable with respect to the other of said anode and said cathode characterized in that said anode support has a partially beveled surface which slidingly support means provided on said cathode support of an adjacent cell to enable movement of said cathode support of said adjacent cell relative to said anode support and each of said cathodes carries spacers operative to maintain a predetermined spacing between said anode and said cathode of each of said cells.

2. An electrochemical cell as set forth in claim 1 characterized in that said means provided on said cathode support of said adjacent cell comprises a complementary beveled surface.

3. An electrochemical cell as set forth in claim 2 further comprising a metal strip, seal means, and a metal sheet for each of said cells, said anode of each of said cells being secured to said metal sheet, said seal means of each of said cells being disposed between the periphery of said metal sheet and said anode support, and said metal strip of each of said cells being disposed between said metal sheet and said anode support.

4. An electrochemical cell as set forth in claim 2 wherein said cathode support of each of said cells is open on one side so as to expose one side of said cathode to air and further comprising second seal means for each of said cells extending between and secured to said anode support of said adjacent cell and said cathode support.

5. An electrochemical cell as set forth in claim 1 wherein said means provided on said cathode support comprise outwardly projecting cylindrical pins slidably supported on said partially beveled surface.

6. An electrochemical cell as set forth in claim wherein said partially beveled surface comprises a slanting groove receiving said cylindrical pins.

7. An electrochemical cell as set forth in claim 6 further comprising a metal strip, seal means, and a metal sheet for each of said cells, said anode of each of said cells being secured to said metal sheet, said seal means of each of said cells being disposed between the periphery of said metal sheet and said anode support, and said metal strip of each of said cells being disposed between said metal sheet and said anode support.

8. An electrochemical cell as set forth in claim 7 wherein said cathode support of each of said cells is open on one side so as to expose one side and said cathode to air and further comprising second seal means for each of said cells extending between and secured to said anode support of said adjacent cell and said cathode support.

9. An electrochemical cell as set forth in claim 6 wherein said cathode support of each of said cells is open on one side so as to expose one side of said cathode to air and further comprising second seal means for each of said cells extending between and secured to said anode support of said adjacent cell and said cathode support.

10. An electrochemical cell as set forth in claim 5 further comprising a metal strip, seal means, and a metal sheet for each of said cells, said anode of each of said cells being secured to said metal sheet, said seal means of each of said cells being disposed between the periphery of said metal sheet and said anode support, and said metal strip of each of said cells being disposed between said metal sheet and said anode support.

11. An electrochemical cell as set forth in claim 10 wherein said cathode support of each of said cells is open on one side so as to expose one side of said cathode to air and further comprising second seal means for each of said cells extending between and secured to said anode support of said adjacent cell and said cathode support.

12. An electrochemical cell as set forth in claim 5 wherein said cathode support of each of said cells is open on one side so as to expose one side of said cathode to air and further comprising second seal means for each of said cells extending between and secured to said anode support of said adjacent cell and said cathode support.

13. An electrochemical cell having an anode, a support for said anode, a cathode, a support for said cathode, one of said anode and said cathode being movable with respect to the other of said anode and said cathode characterized in that said anode support and said cathode support are movably interconnected by means of links pivotably secured to each of said anode support and cathode support to enable relative movement therebetween and said cathode includes spacers secured thereto operative to maintain a predetermined spacing between said anode and said cathode.

14. An electrochemical cell as set forth in claim 13 further comprising a metal strip, seal means, and a metal sheet, said anode being secured to said metal sheet, said seal means being disposed between the periphery of said metal sheet and said anode support, and said metal strip being disposed between said metal sheet and said anode support.

15. An electrochemical cell as set forth in claim 14 wherein said cathode support is open on one side so as to expose one side of said cathode to air and further comprising second seal means extending between and secured to said anode support of said adjacent cell and said cathode support.

16. An electrochemical cell as set forth in claim 13 wherein said cathode support is open one one side so as to expose one side of said cathode to air and further comprising second seal means extending between and secured to said anode support of said adjacent cell and said cathode support.

17. An electrochemical cell having a housing, an anode supported within said housing, a cathode, support means for said cathode, said cathode support means being movably disposed within said housing characterized in that said housing includes means defining a beveled surface, said cathode support means being movably supported by said beveled surface for movement toward said anode and spacer means secured to said cathode operative to maintain a predetermined spacing between said anode and said cathode.

18. An electrochemical cell as set forth in claim 17 wherein said cathode support means include outwardly projecting pins supported by said beveled surface.

19. An electrochemical cell as set forth in claim 17 further comprising a metal strip, seal means, and a metal sheet, said anode being secured to said metal sheet, said seal means being disposed between the periphery of said metal sheet and said housing and said metal strip being disposed between said metal sheet and said housing.

20. An electrochemical cell as set forth in claim 17 wherein said cathode support means is open on one side so as to expose one side of said cathode to air and further comprising second seal means extending between and secured to said housing and said cathode support means.

* * * * *

UNITED STATES PATENT AND TRADEMARK OFFICE
CERTIFICATE OF CORRECTION

PATENT NO. : 4,800,009            Page 1 of 2
DATED : January 24, 1989
INVENTOR(S) : Aleksandar Despic and Kosta Krsmanovic It is certified that error appears in the above-identified patent and that said Letters Patent is hereby corrected as shown below:

Column 1, line 34, "electrode" should be --electrodes--.

Column 2, line 14, "1band" should be --1b and--.

Column 2, line 34, "(FIG. 1, 1a)" should be --(FIG. 1a)--.

Column 2, line 35, "(FIG. 1, 1b)" should be --(FIG. 1b)--.

Column 2, line 62, "$1_c = 1_A d_A^2 + 2(2\Delta + d_E)d_A$" should be
--$1_c = 1_A + d_A^2 + 2(2\Delta + d_E)d_A$--.

Column 3, line 26, "of", second occurrence, should be -- on --.

Column 3, line 65, "structure" should be --structures--.

Column 4, line 13, "silicon" should be --silicone--.

Column 4, line 46, "srip" should be --strip--.

Column 5, line 2, Claim 1, (first occurrence), after "support" insert --for--.

Column 5, line 7, Claim 1, (first occurrence), "support" should be --supports--.

Column 5, line 36, Claim 6, after "claim" insert --5--.

UNITED STATES PATENT AND TRADEMARK OFFICE
CERTIFICATE OF CORRECTION

PATENT NO. : 4,800,009

DATED : January 24, 1989

INVENTOR(S) : Aleksandar Despic and Kosta Krsmanovic

It is certified that error appears in the above-identified patent and that said Letters Patent is hereby corrected as shown below:

Column 5, line 49, Claim 8, "and" should be --of--.

Column 6, line 39, Claim 16, (first occurrence), "one" should be --on--.

Signed and Sealed this

Eighteenth Day of July, 1989

Attest:

DONALD J. QUIGG

Attesting Officer

Commissioner of Patents and Trademarks